(12) United States Patent
Sato

(10) Patent No.: US 10,178,347 B2
(45) Date of Patent: Jan. 8, 2019

(54) REMOTE COMMUNICATION SYSTEM, METHOD FOR CONTROLLING REMOTE COMMUNICATION SYSTEM, AND PROGRAM

(71) Applicant: CANON KABUSHIKI KAISHA, Tokyo (JP)

(72) Inventor: Hirochika Sato, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/572,127

(22) PCT Filed: Mar. 30, 2016

(86) PCT No.: PCT/JP2016/001842
§ 371 (c)(1),
(2) Date: Nov. 6, 2017

(87) PCT Pub. No.: WO2016/181599
PCT Pub. Date: Nov. 17, 2016

(65) Prior Publication Data
US 2018/0139409 A1   May 17, 2018

(30) Foreign Application Priority Data
May 8, 2015   (JP) ................................ 2015-095885

(51) Int. Cl.
*H04N 7/14*   (2006.01)
*H04N 7/15*   (2006.01)
(Continued)

(52) U.S. Cl.
CPC ............. *H04N 7/147* (2013.01); *G03B 17/54* (2013.01); *G06K 9/4604* (2013.01); *G06T 11/60* (2013.01);
(Continued)

(58) Field of Classification Search
CPC .......... H04N 7/147; H04N 7/142; H04N 7/15; H04N 5/247; G06T 11/60; G06K 9/4604; G03B 17/54
See application file for complete search history.

(56) References Cited

U.S. PATENT DOCUMENTS 5,990,932 A    11/1999  Bee et al.
9,900,568 B2 *  2/2018  Muramatsu .......... H04N 9/3188
(Continued)

FOREIGN PATENT DOCUMENTS

JP    07-154777 A    6/1995
JP    2008-191613 A   8/2008

OTHER PUBLICATIONS

International Search Report and Written Opinion for PCT/JP2016/001842 and notification of transmittal of the ISR/WO, dated Jun. 14, 2016.
(Continued)

*Primary Examiner* — Stella L. Woo
(74) *Attorney, Agent, or Firm* — Canon U.S.A., Inc. I.P. Division

(57) ABSTRACT

The present invention provides a scheme that allows a person to communicate with another person at a remote site while giving the realistic sensation as if the persons faced each other in close proximity by capturing the images of the person using a plurality of image capturing units.
A remote communication system includes a projector configured to project, on to a screen, an image transmitted from a remote site. The screen has a plurality of front cameras disposed thereon. A CPU performs an extraction process to extract a person part from each of images captured by the front cameras and a combining process to combine the images captured by the front cameras. The remote communication system further includes a projector that projects the
(Continued)

image subjected to the extraction process and the combining process onto a screen set in the remote site.

20 Claims, 10 Drawing Sheets

(51) Int. Cl.
    *G03B 17/54*    (2006.01)
    *G06K 9/46*     (2006.01)
    *G06T 11/60*    (2006.01)
    *H04N 5/247*    (2006.01)

(52) U.S. Cl.
    CPC ............. *H04N 5/247* (2013.01); *H04N 7/142* (2013.01); *H04N 7/15* (2013.01)

(56) References Cited

U.S. PATENT DOCUMENTS

| | | | | |
|---|---|---|---|---|
| 2008/0259154 A1* | 10/2008 | Garrison | ........... | H04N 7/14 348/14.01 |
| 2012/0050458 A1* | 3/2012 | Mauchly | ........... | H04N 5/23238 348/14.16 |
| 2013/0050398 A1* | 2/2013 | Krans | ........... | H04N 7/142 348/14.07 |
| 2013/0093838 A1* | 4/2013 | Tan | ........... | H04N 7/144 348/14.16 |
| 2014/0313277 A1* | 10/2014 | Yarosh | ........... | H04N 7/15 348/14.08 |
| 2014/0362163 A1* | 12/2014 | Winterstein | ........... | H04N 7/15 348/14.07 |
| 2015/0029294 A1* | 1/2015 | Lin | ........... | H04N 7/141 348/14.01 |
| 2016/0260236 A1* | 9/2016 | Fogarty | ........... | G06T 3/40 |

OTHER PUBLICATIONS

Go, et al., "2006-0011 Background generating system at the region-based virtual viewpoint image generation", Sony Journal of technical disclosure, vol. 15, No. 1, pp. 1-15, Jan. 10, 2006, Partial translation included.

Ichikawa, et al., "MAJIC Videoconferencing System: Experiments, Evaluation and Improvement", Proceedings of the Fourth European Conference on Computer-Supported Cooperative Work, pp. 279-292, Sep. 11, 1995.

Zillner, et al., "3D-Board: A Whole-body Remote Collaborative Whiteboard", Proceedings of the 27th annual ACM symposium on User interface software and technology, Oct. 8, 2014.

* cited by examiner

REMOTE COMMUNICATION SYSTEM, METHOD FOR CONTROLLING REMOTE COMMUNICATION SYSTEM, AND PROGRAM

CROSS-REFERENCE TO RELATED APPLICATIONS

This application is a national phase application of international application PCT/JP2016/001842, filed on Mar. 30, 2016, which is hereby incorporated by reference herein in its entirety, and this application claims the benefit of Japanese Patent Application No. 2015-095885, filed May 8, 2015, which is hereby incorporated by reference herein in its entirety.

TECHNICAL FIELD

The present invention relates to a remote communication system used to communicate with a remote site, a method for controlling the remote communication system, and a program.

BACKGROUND ART

Systems used to communicate with a communication partner located at a separate place (a remote site) have been developed. For example, PTL 1 describes a remote conference system used to conduct a conference with a person located at a separate place. The system described in PTL 1 includes a camera for capturing the images of a person, a projector for projecting the images, and a screen that displays the images projected by the projector.

According to the system described in PTL 1, the image of a person captured by a camera set in a conference room is projected onto a screen by a projector set at the location of the communication partner (a remote site). In addition, the image of a person captured by a camera set at the location of the communication partner is projected onto a screen by a projector set in the conference room. Furthermore, according to the system described in PTL 1, by displaying a real-size image of a person, the realistic sensation of actually being in a conference room can be increased.

When several people physically located in the same space (e.g., the same room) communicate with one another, the people are generally standing and face one another at a distance of about 1 to 2 m. If such a form of communication or a similar form of communication can be applied to communication with people in a remote site, the people can easily communicate with one another and understand one another. However, it is difficult for existing systems to give sufficient realistic sensation, since even when the real-size image of a person is projected, a sensation of facing each other in close proximity cannot be generated if the distance between the projection plane and the person is significantly large.

If, to solve such an issue, a person stands in close proximity to the screen, people may feel that the person is in close proximity thereof. However, if the person stands in close proximity to the screen, it is difficult for a camera to capture the entire front image of the person. If the camera is set in very close proximity of the screen, part of the image of the person (e.g., the image of only the upper body) can be captured. However, since the angle of view of the camera in the vertical direction is limited, the image of the entire body of the person cannot be captured. If the image of the entire body of the person is not displayed, the realistic sensation of actually being there is reduced. In addition, it is difficult to have a conversation through talking and gesture or behavior.

CITATION LIST

Patent Literature

PTL 1: Japanese Patent Laid-Open No. 2008-191613

SUMMARY OF INVENTION

The present invention provides a scheme that allows a person to communicate with another person at a remote site while giving the realistic sensation as if the persons faced each other in close proximity by capturing the images of the person using a plurality of image capturing units.

Solution to Problem

According to an aspect of the present invention, a remote communication system includes a first projector configured to project an image transmitted from a remote site onto a first projection plane, a plurality of image capturing units disposed on the first projection plane, an extraction unit configured to extract a person part from each of images captured by the plurality of image capturing units, a combining unit configured to combine the images captured by the image capturing units, and a second projector configured to project, onto a second projection plane disposed at the remote site, the image extracted by the extraction unit and combined by the combining unit.

Further features of the present invention will become apparent from the following description of exemplary embodiments with reference to the attached drawings.

DESCRIPTION OF EMBODIMENT

An exemplary embodiment of the present invention is described in detail below with reference to the accompanying drawings. The following description of the exemplary embodiment is merely illustrative in nature and is in no way intended to limit the invention defined by the claims. All of the features and the combinations thereof described in the embodiment are not necessarily essential to the invention.

Figure 1A:
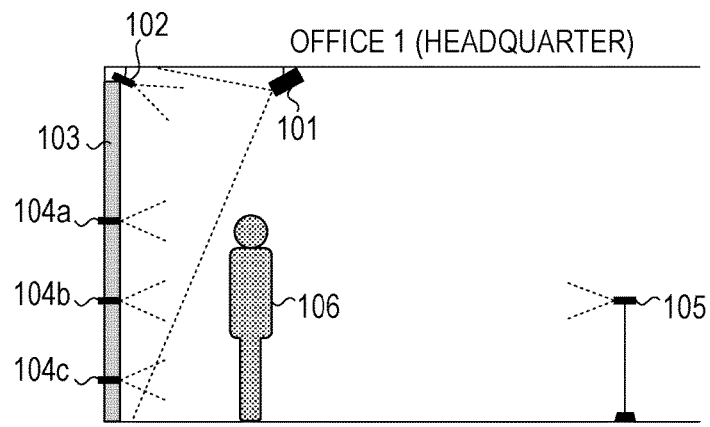
FIG. 1A is a cross-sectional view of a remote communication system according to an exemplary embodiment of the present invention.
Figure 1B:
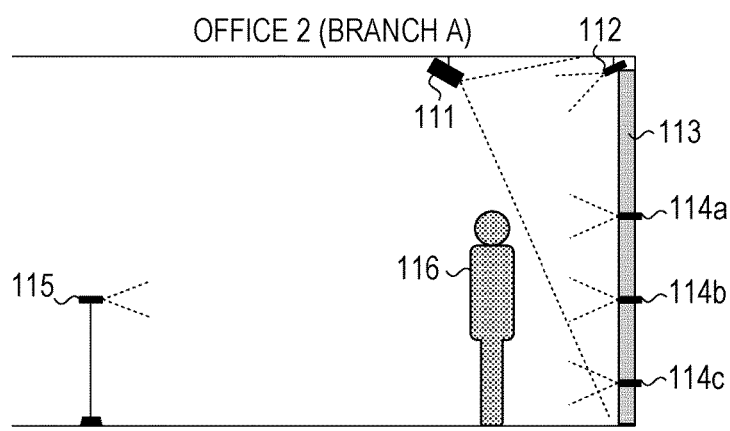
FIG. 1B is a cross-sectional view of the remote communication system according to the exemplary embodiment of the present invention.
Figure 1C:
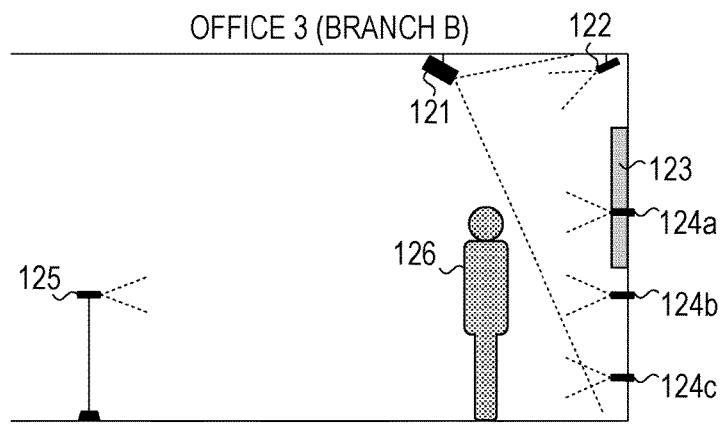
FIG. 1C is a cross-sectional view of the remote communication system according to the exemplary embodiment of the present invention.

FIGS. 1A to 1C are cross-sectional views of a remote communication system according to the present invention. By using the remote communication system, communication can be performed between an office 1 disposed in a headquarter and an office 2 disposed on a branch A or between the office 1 and an office 3 disposed in a branch B. Note that while the description is given with reference to three offices as an example, communication may be performed only between two offices, that is, the office 1 and the office 2. In addition, all the offices may be referred to as a "remote communication system". Alternatively, only the configuration included in a single office may be referred to as a "remote communication system".

In addition, the offices described herein may be separated so that the time required to move from one of the offices to the other is several hours, or the offices may be different conference rooms in the same building. That is, the term "remote" refers to physically different spaces and does not define the physical distance and the time length required for movement from one place to another.

The office 1 illustrated in FIG. 1A has a projector 101, a background camera 102, a screen 103, front cameras 104, and a back camera 105 disposed therein. The projector 101 is a projection device that projects an image captured in any one of the other offices onto the screen 103. The screen 103 serves as a projection plane that displays the image projected by the projector 101. Note that the screen 103 may be a screen temporarily placed when communication is performed with one of the other offices. Alternatively, a wall of the office may serve as the screen 103. In addition, while the present exemplary embodiment is described with reference to an example in which the projector and the screen are used to display an image, the image may be displayed using a large liquid crystal display.

The front cameras 104 are front image capturing devices for capturing the images of the person 106. In this example, to capture the image of the whole body of the person 106, three front cameras 104, that is, front cameras 104a, 104b, and 104c are employed. However, two front cameras or four or more front cameras may be employed. The process related to capturing the image of the person 106 using the front cameras 104 is described in more detail below.

The background camera 102 is a background image capturing device that captures the background image of the person 106 (i.e., the image taken in the right direction in FIG. 1A). In this example, the office 1 is not a room dedicated to remote communication, but is an ordinary office room for everyday business. The background image captured by the background camera 102 contains the images of desks, chairs, and cabinets of employees and the image of a person who is conducting another business transaction. By projecting such a background image together with the image of the person captured by the front cameras 104, a simulated environment as if employees stood and chatted with one another in the corner of the office room can be produced. Note that to prevent the background image (an object) from being hidden by the image of the person 106, it is desirable that the background camera 102 be mounted on the upper section of the room in the vertical direction (near the ceiling).

The back camera 105 is a back image capturing device for capturing the image of the person 106 or the image displayed on the screen 103 in the direction from the right to the left in FIG. 1A. Since the person 106 faces to the screen 103 (i.e., the left in FIG. 1A) during remote communication, the back camera 105 captures the image of the person 106 from behind. Note that the distance between the back camera 105 and the person 106 is longer than the distance between the front camera 104 and the person 106. Accordingly, the back camera 105 can capture the image of the entire body of the person 106.

The front camera 104 includes a range sensor for detecting the distance from the front camera 104 to the subject. The image captured by the front camera 104 includes an RGB color image with 8 bits per channel and 3 channels and a range image with 8 bits per channel and 1 channel. In contrast, each of the background camera 102 and the back camera 105 does not include a range sensor. Accordingly, an image captured by each of the background camera 102 and the back camera 105 includes an RGB color image with 8 bits per channel and 3 channels, but does not include a range image. Note that the images captured by each of the front camera 104, the background camera 102, and the back camera 105 are time-series still images, which are sequentially projected in a remote site. In this manner, the images are played back in the form of a moving image.

Like the office 1, in the office 2 in which a person 116 is located (FIG. 1B), equipment similar to that in the office 1 (i.e., a projector 111, a background camera 112, a screen 113, a front camera 114, and a back camera 115) is provided. In addition, in the office 3 in which a person 126 is located (FIG. 1C), equipment similar to that in the office 1 or 2 (i.e., a projector 121, a background camera 122, a screen 123, a front camera 124, and a back camera 125) is provided. Note that each of the screens 103 and 113 measures 2.3 meters high by 4 meters wide. In contrast, the screen 123 has a relatively smaller size and measures 1 meter high by 2 meters wide. When communication using a real-size projected image of the entire body is desirable, the offices 1 and 2 each having a large screen need to be used. However, if the space is limited, a small screen can be used as in the office 3. At that time, the image of the entire body of a person located in the remote site cannot be displayed on the screen 123. Thus, for example, the image of only the upper body of the person is projected on the screen 123.

Figure 2:
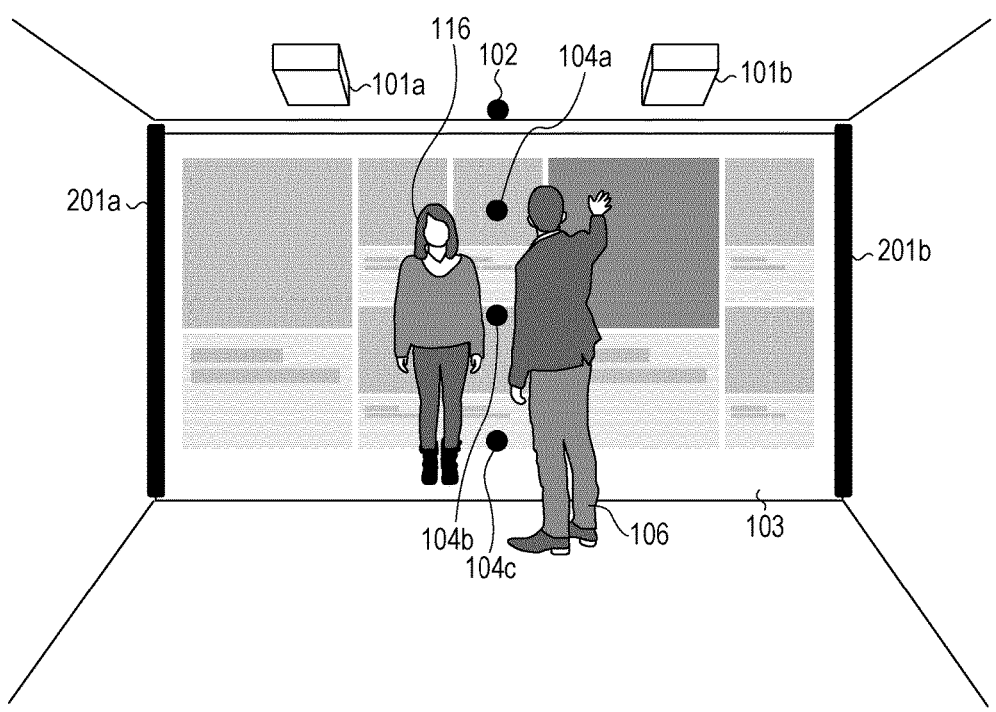
FIG. 2 is an external view of the remote communication system according to the exemplary embodiment of the present invention.

FIG. 2 is an external view of the remote communication system viewed in a direction from the right to the left in FIG. 1A. In FIG. 2, the person 106 located in the office 1 is communicating with the person 116 located in the office 2. Since as described above, the screen 103 is horizontally long, two projectors 101 (i.e., projectors 101a and 101b) are provided. However, a single projector may project the image. The background camera 102 is set in the upper middle of the screen 103. The front cameras 104a, 104b, and 104c are embedded in the screen 103 so as to be arranged in a line in the middle section of the screen 103 in the vertical direction.

A digitizer 201 is a detecting device that detects the operation performed on the screen 103 by a user. The digitizer 201 includes a transmitter 201a and a receiver 201b. If an infrared light beam projected by the transmitter 201a is blocked by, for example, part of the body of the person 106 or a pointer held by the person 106, the digitizer 201 outputs the coordinates of the position. Note that in this example, the transmitter 201a and the receiver 201b are disposed at the left and right ends of the screen 103, respectively. However, the transmitter 201a and the receiver 201b may be disposed at the upper and lower ends of the screen 103, respectively. In addition, a technique for detecting the operation performed by a user is not limited to a technique using a digitizer. For example, the screen 103 may have a touch panel function, and a position in the screen 103 at which the screen 103 is pressed may be detected.

The image of the person 116 captured by the front camera 114 set in the office 2 is projected onto the screen 103. In addition, in FIG. 2, a document (e.g., a conference material) stored in a document management server 340 (described below) is displayed as the background image of the person 116. It can be switched whether as the background of the person 116, a document stored in the document management server 340 is projected or the background image of the office 2 captured by the background camera 112 is projected in accordance with the operation performed by the person 116 and detected by the digitizer 201.

Figure 3:
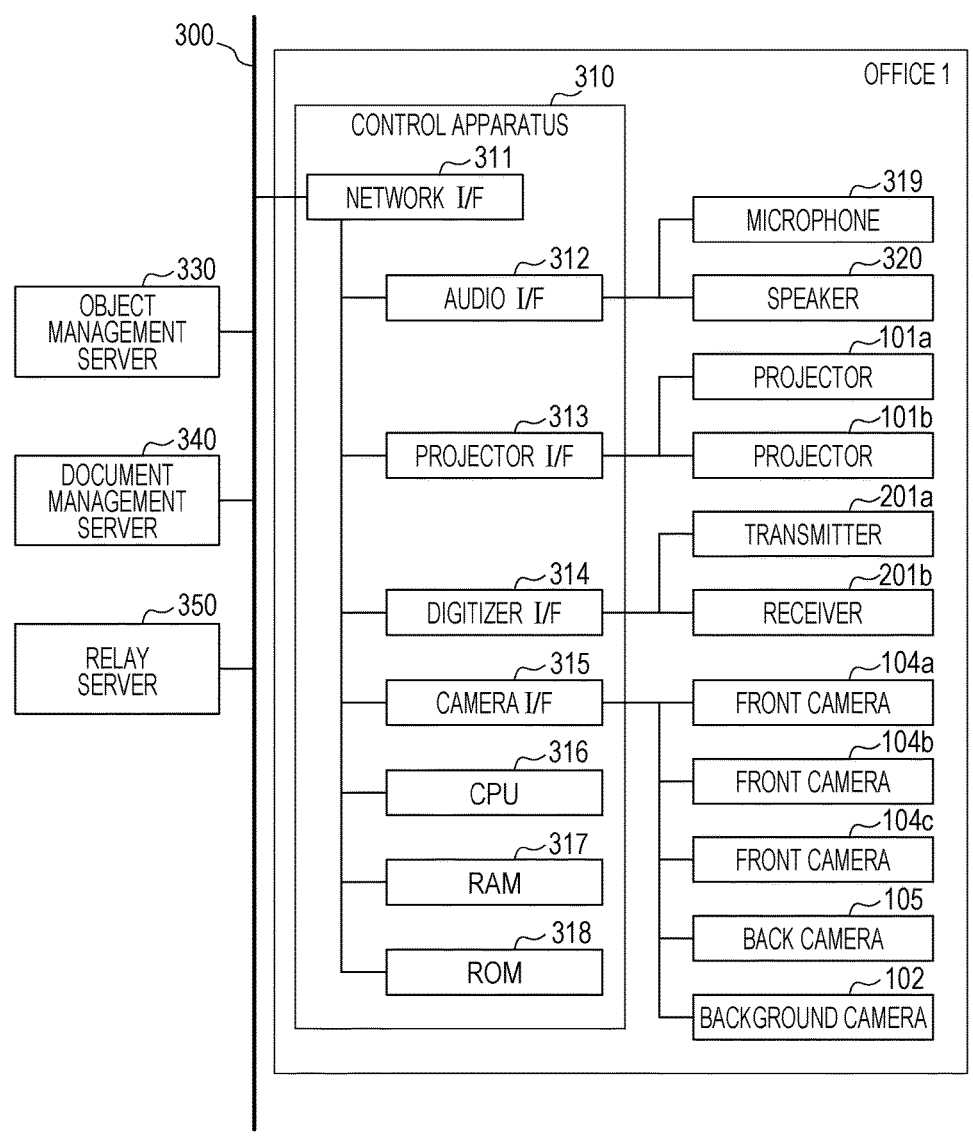
FIG. 3 is a hardware configuration diagram of the remote communication system according to the exemplary embodiment of the present invention.

FIG. 3 is a hardware configuration diagram of the remote communication system. A central processing unit (CPU) 316 included in a control apparatus 310 reads out a control program stored in a read only memory (ROM) 318 and controls the equipment provided in the office 1. A random access memory (RAM) 317 is used as temporary memory areas, such as a main memory and a work area of the CPU 316. Note that in the office 1, the CPU 316 uses a single memory (the RAM 317) and performs processes indicated by a flowchart described below. However, another form of processing can be employed. For example, a control apparatus 310 may be provided for each of the cameras, projectors, and digitizer. Thus, the processes may be performed by a plurality of CPUs and RAMs (or hard disk drives (HDDs) or solid state drives (SSDs)) that are in cooperation with one another. Alternatively, some of the processes described below may be performed by a hardware circuit, such as an application specific integrated circuit (ASIC).

The offices are connected to one another using a network 300. Any network selected from among a wired network, a wireless network, a wide area network (WAN), a local area network (LAN), a public line, and a dedicated line can be employed as the network 300 in accordance with the environment. To connect the office 1 to the network 300, a network interface (I/F) 311 is employed.

Each of the offices has a microphone and a speaker disposed therein (not illustrated in FIGS. 1A to 1C and FIG. 2). The speech emanated from a person in the office is converted into an audio signal by a microphone and is output from a speaker in a remote site. The office 1 has a microphone 319 and a speaker 320 disposed therein. To control the input of speech using the microphone 319 and the output of the speech using the speaker 320, an audio I/F 312 is employed.

To control projection of an image using the projector 101, a projector I/F 313 is employed. To control detection of the operation performed by a user using the digitizer 201, a digitizer I/F 314 is employed. To control the image capturing operations performed by the front camera 104, the back camera 105, and the background camera 102, a camera I/F 315 is employed.

Note that each of the offices 2 and 3 has a configuration that is the same as that of the office 1 (not illustrated). Examples of the above-mentioned interfaces include a universal serial bus (USB), a high definition multimedia interface (HDMI (trade name)), a wired LAN, and a wireless LAN, one of which is selected as needed.

When an image captured in one of the offices and speech input in an office are sent to the other office, a relay server 350 relays the image and speech. The document management server 340 stores documents to be projected onto the screen by the projector in each of the offices (e.g., a conference material). As illustrated in FIG. 2, upon receiving an instruction to project a document together with the image of the person, the CPU 316 acquires the document from the document management server 340 and causes the projector 101 to project the document. Note that the instruction to project the document can be output from either one of the offices that perform remote communication.

When the screen 103 is used as an operation unit of the remote communication system, an object management server 330 stores objects to be projected onto the screen 103 by the projector 101. An example of the object is an operation button used to select one of the offices to be connected. If the remote communication system is started in the office 1, the CPU 316 acquires, from the object management server 330, selection buttons each corresponding to one of the offices and causes the projector 101 to project the selection buttons onto the screen 103. If the person 106 touches the screen 103, the digitizer 201 detects the coordinates of the touched position, and the CPU 316 identifies one of the selection buttons corresponding to the detected coordinates. Thereafter, the CPU 316 starts remote communication with the office corresponding to the identified selection button.

Figure 4:
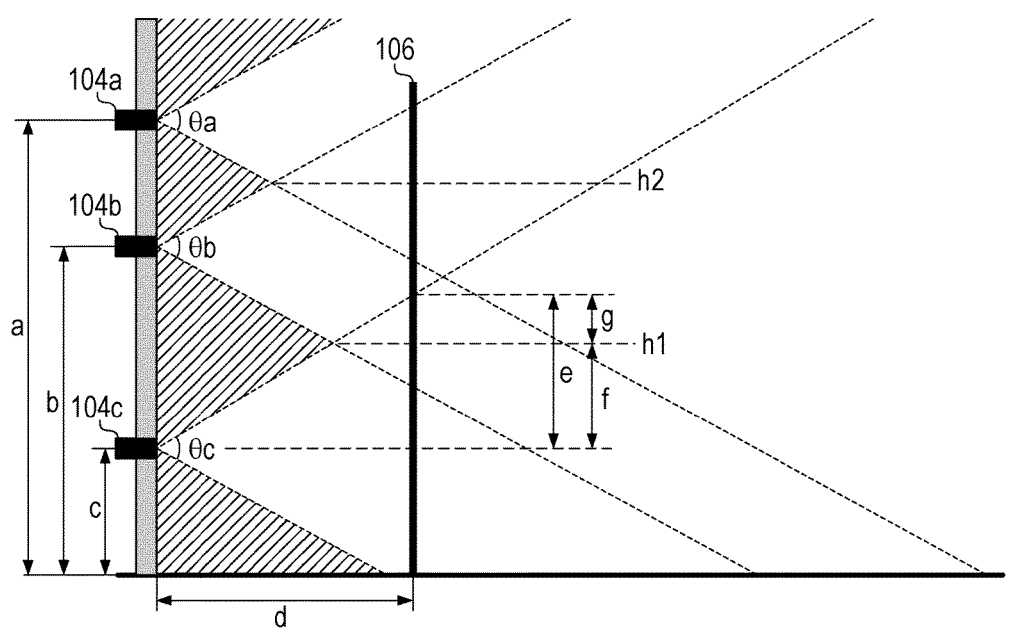
FIG. 4 illustrates the image capturing area of a front camera according to the exemplary embodiment of the present invention.

FIG. 4 illustrates the image capturing areas of the front cameras 104. The front cameras 104a, 104b, and 104c are set at heights of a (1800 mm), b (1300 mm), and c (500 mm) from the floor surface, respectively. That is, the arrangement interval between the front camera 104a and front camera 104b (500 mm) is shorter than the arrangement interval between the front camera 104b and front camera 104c (800 mm). In addition, the arrangement interval between the front camera 104b and front camera 104c (800 mm) is longer than the arrangement interval between the front camera 104c and the floor surface. Such an arrangement is employed so that each of the boundaries between the images is located at a position in the image of the person where the boundary is not prominent (in the vicinity of the chest and waist) when the images of the person are combined (described below, refer to FIG. 5 and FIGS. 6A to 6F).

The angles of view of the front cameras 104a, 104b, and 104c in the vertical direction are θa, θb, and θc, respectively. In this example, θa, θb, and θc are the same. However, the front cameras having different angles of view may be employed. A distance d from the front camera 104 to the person 106 is calculated on the basis of the range image captured by the front camera 104. A height h1 indicates a height of the middle point between the front camera 104b and the front camera 104c. The height h1 can be obtained by adding a height c of the front camera 104c to a length f, which is obtained by dividing the difference between the heights of the front camera 104b and the front camera 104c by 2. Similarly, a height h2 indicates a height of the middle point between the front camera 104a and the front camera 104b. The height h2 can be obtained by adding a height b of the front camera 104b to a length obtained by dividing the difference between the heights of the front camera 104a and the front camera 104b by 2.

A length e is a length corresponding to the difference between the highest position in the image of the person 106 captured by the front camera 104c and the height c of the front camera 104c. The length e can be obtained on the basis of an angle obtained by dividing θc by 2 and the distance d from the front camera 104 to the person 106.

Figure 5:
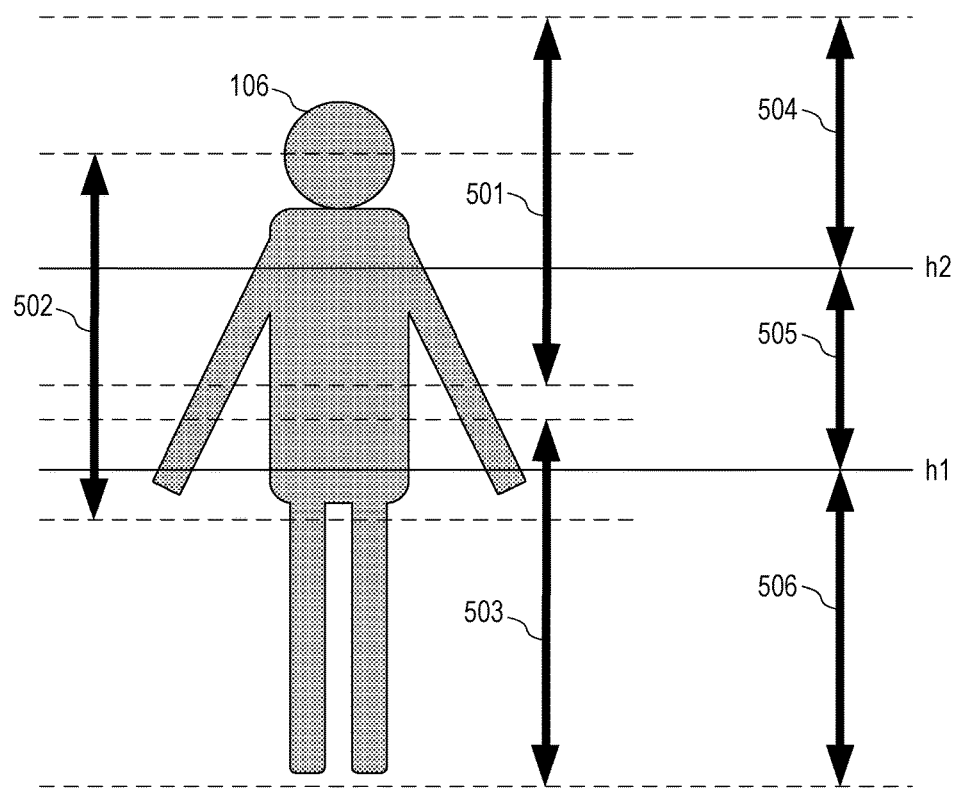
FIG. 5 illustrates the image capturing area of the front camera and a trimming process according to the exemplary embodiment of the present invention.

A combining process of the images captured by the front cameras 104 is described next with reference to FIG. 5 and FIGS. 6A to 6F. In FIG. 5, ranges 501, 502, and 503 indicate the ranges of the body of the person 106 captured by the front cameras 104a, 104b, and 104c, respectively. As illustrated in FIG. 5 and FIGS. 6A to 6F, the range 501 captured by the front camera 104a partially overlaps the range 502 captured by the front camera 104b. In addition, the range 502 captured by the front camera 104b partially overlaps the range 503 captured by the front camera 104c.

According to the present exemplary embodiment, to combine the images captured by the front cameras 104, the overlapping portions are removed. At that time, the process is performed so that the boundaries are located at the height h1 and the height h2. As a result, the image captured by the front camera 104a is used as a range 504. The image captured by the front camera 104b is used as a range 505, and the image captured by the front camera 104c is used as a range 506.

Figure 6A:
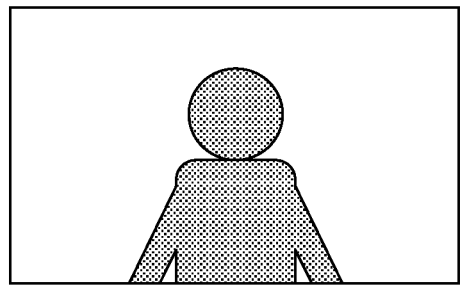
FIG. 6A illustrates an image capturing area of a front camera and the trimming process according to the exemplary embodiment of the present invention.
Figure 6B:
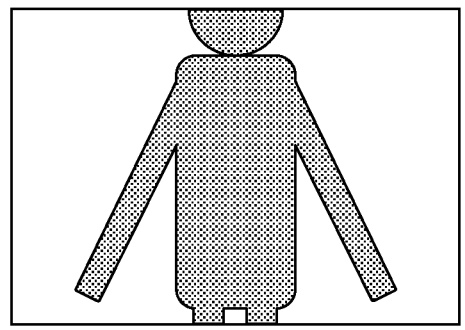
FIG. 6B illustrates an image capturing area of a front camera and the trimming process according to the exemplary embodiment of the present invention.
Figure 6C:
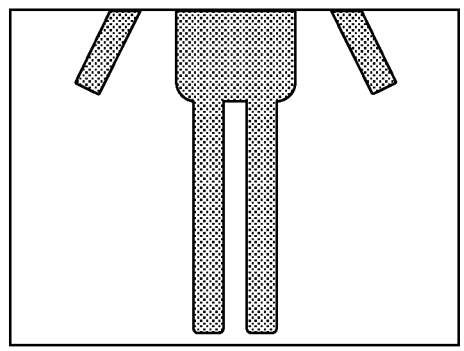
FIG. 6C illustrates an image capturing area of a front camera and the trimming process according to the exemplary embodiment of the present invention.
Figure 6D:
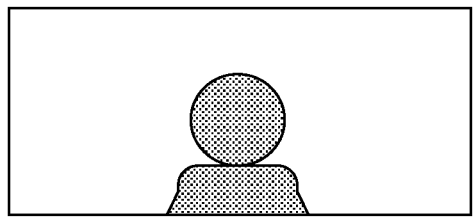
FIG. 6D illustrates the image capturing area of the front camera and the trimming process according to the exemplary embodiment of the present invention.
Figure 6E:
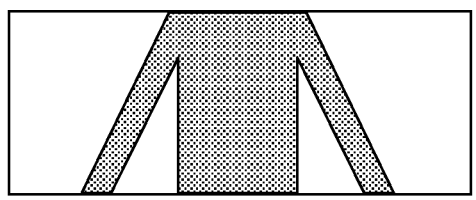
FIG. 6E illustrates the image capturing area of the front camera and the trimming process according to the exemplary embodiment of the present invention.
Figure 6F:
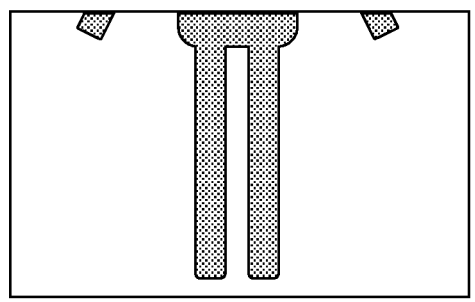
FIG. 6F illustrates the image capturing area of the front camera and the trimming process according to the exemplary embodiment of the present invention.

FIGS. 6A, 6B, and 6C illustrate the images captured by the front cameras 104a, 104b, and 104c, respectively. Referring to FIG. 5, the image in FIG. 6A corresponds to the range 501. However, since the image used for projection in the remote site is the range 504, a range corresponding to the difference between the range 501 and the range 504 is removed and, thus, the image illustrated in FIG. 6D is generated. Similarly, the image in FIG. 6B corresponds to the range 502. However, since the image used for projection in the remote site is the range 505, a range corresponding to the difference between the range 502 and the range 505 is removed and, thus, the image illustrated in FIG. 6E is generated. Still similarly, the image in FIG. 6C corresponds to the range 503. However, since the image used for projection in the remote site is the range 506, a range corresponding to the difference between the range 503 and the range 506 is removed and, thus, the image illustrated in FIG. 6F is generated. Through such a process, the images illustrated in FIGS. 6D, 6E, and 6F are obtained, and the images are combined (concatenated). In this manner, the image of the entire body of the person 106 can be obtained.

A process to generate the image illustrated in FIG. 6F from the image illustrated in FIG. 6C is described in more detail below. The central point of the image illustrated in FIG. 6C corresponds to the height c at which the front camera 104c is disposed. In addition, the image above the central point corresponds to the range of the length e illustrated in FIG. 4. To remove, from the image in the range of the length e, the image in the range of the length g and leave the image in the range of the length f, it is determined that from the pixels of the image captured by the front camera 104c arranged in the vertical direction (1080 pixels), the pixels equal in number to the ratio of the length g to the length e are to be removed. For each of the images illustrated in FIGS. 6A and 6B, a portion to be removed is determined in the same manner.

Figure 7:
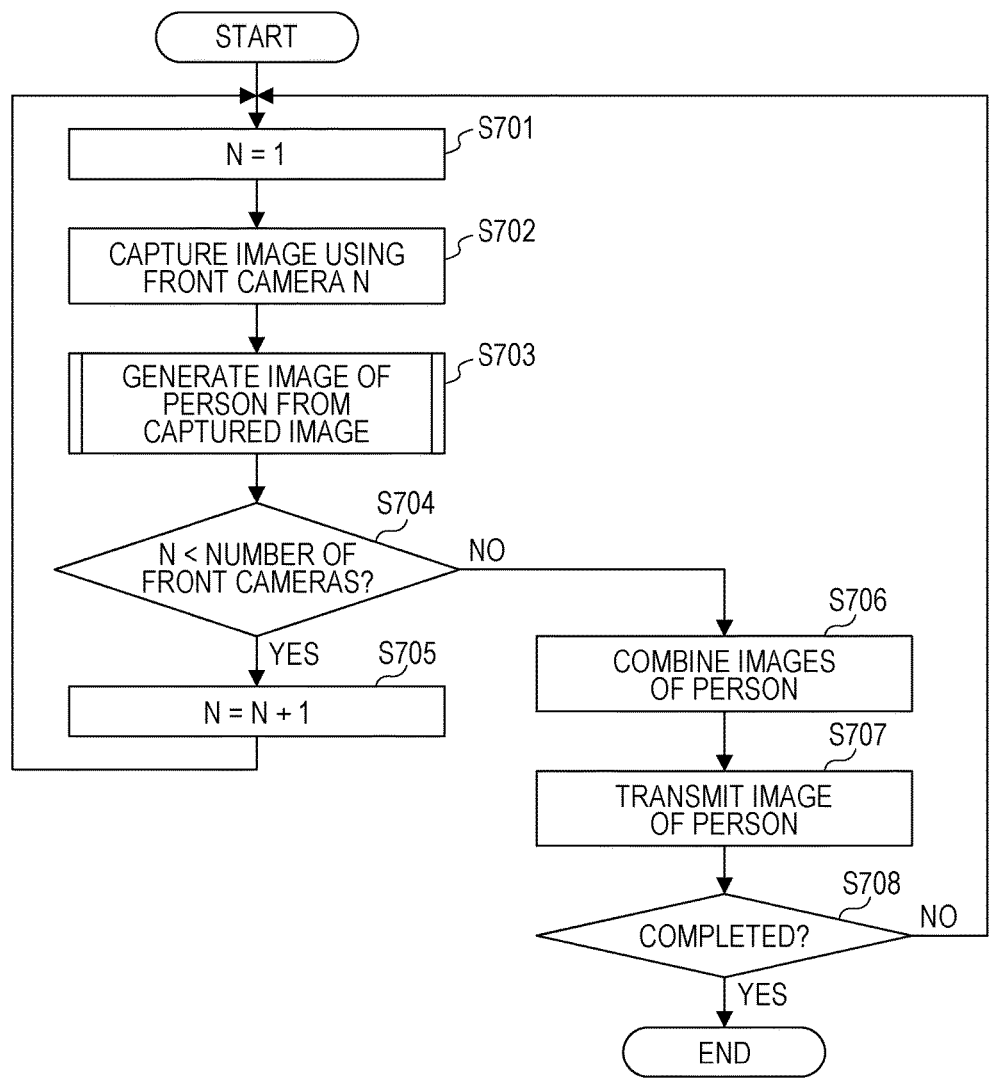
FIG. 7 is a flowchart of a process to capture the image of a person according to the exemplary embodiment of the present invention.
Figure 8:
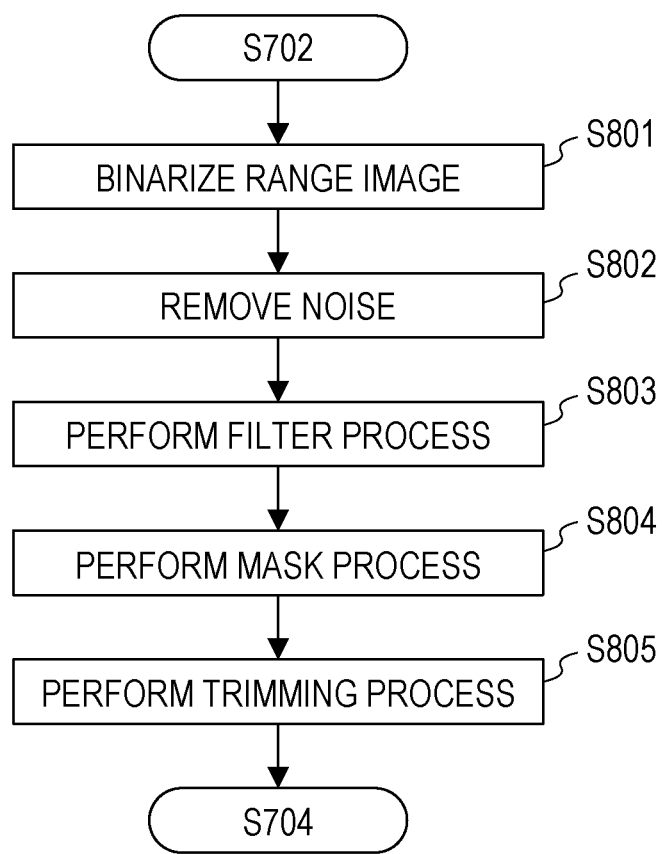
FIG. 8 is a flowchart of the process to capture the image of the person according to the exemplary embodiment of the present invention.

FIGS. 7 and 8 are flowcharts illustrating a process to capture the images of the person 106 using the front cameras 104 and a process to combine the images of the person captured by the front cameras 104. Each of operations (steps) indicated by the flowcharts in FIGS. 7 and 8 is realized by the CPU 316 that is disposed in the office 1 and that executes a control program stored in the ROM 318.

In step S701, the value of a variable N is initialized to 1. In step S702, among the front cameras 104a, 104b, and 104c, the CPU 316 instructs the front camera 104 corresponding to the variable N to capture the image of the person 106. In step S703, the image of only the person 106 is generated from the image captured by the front camera 104.

FIG. 8 is a flowchart illustrating the process performed in step S703 in detail. In step S801, a range image included in the captured image obtained in step S702 is binarized. According to the present exemplary embodiment, the person 106 stands at a position in the range from the position away from the screen 103 (the front camera 104) by 1 meter to the position away from the screen 103 by 2 meters. Accordingly, a minimum value of the distance from the front camera 104 to the subject is set to 1 meter, and the maximum value of the distance is set to 2 meters. In addition, for each of the pixels of the range image, the value of the pixel is changed to 255 if the value is within the above-described range. The values of the other pixels are set to 0.

In step S802, an erosion process that replaces the value of the pixel of interest with 0 under the condition that at least one pixel in the neighborhood is 0 or a dilation process that replaces the value of the pixel of interest with 255 under the condition that at least one pixel in the neighborhood is 255 is performed. In this manner, isolated point noise can be removed. In step S803, a smoothing filter process (e.g., a Gaussian filter process) is performed to smooth the outline of an area where pixels each having a value of 255 are continuously arranged.

In step S804, a mask process is performed. Thus, a pixel of the color image corresponding to a pixel of the range image having a value of 255 is made non-transparent, and a pixel of the color image corresponding to a pixel of the range image having a value of 0 is made fully transparent (is transparentized). Through the process, the image of a person part is extracted from the image captured by the front camera 104. As used herein, the term "person part" refers to not only the image of a person but the image of the person and, for example, a pointer or a product sample held by the person.

In step S805, as illustrated in FIG. 5 and FIGS. 6A to 6F, a trimming process to trim the upper end or the lower end of an image is performed on the images of the person illustrated in FIGS. 6A, 6B, and 6C to generate the images of the person illustrated in FIGS. 6D, 6E, and 6F, respectively. More specifically, a predetermined area at the lower end is removed from the image illustrated in FIG. 6A. Predetermined areas at the upper end and the lower end are removed from the image illustrated in FIG. 6B. A predetermined area at the upper end is removed from the image illustrated in FIG. 6C.

Referring back to FIG. 7, in step S704, it is determined whether the value of the variable N is less than the number of the front cameras 104 (3 according to the present exemplary embodiment). If the value of the variable N is less than the number of the front cameras 104, the processing proceeds to step S705, where a value of 1 is added to the variable N. Thereafter, the processing returns to step S701. However, if the value of the variable N is not less than the number of the front cameras 104 (the value of the variable N is equal to the number of the front cameras 104), the processing proceeds to step S706.

In step S706, the images of the person illustrated in FIGS. 6D, 6E, and 6F are combined. More specifically, the image illustrated in FIG. 6E is concatenated to the lower end of the image illustrated in FIG. 6D. In addition, the image illustrated in FIG. 6F is concatenated to the lower end of the above-described concatenated image. Furthermore, since after the concatenating process, a blank (a space above the head, a space on the left of the right hand, a space on the right of the left hand, and a space under the feet) is left in the concatenated image, the trimming process is performed on a rectangular area including the pixels each having a value of 255.

In step S707, the image obtained through the process performed in step S706 is transmitted to the office 2 that is connected to the office 1. In step S708, it is determined whether an instruction to complete the remote communication is received. If an instruction to complete the remote communication is received, the processing is completed. However, if an instruction to complete the remote communication is not received, the processing returns to step S701. Thereafter, the processes in step S701 and the subsequent steps are performed again.

Note that in this example, the processes in steps S703 and S706 are performed on the image capturing side (the office in which a person representing the subject is located). However, the processes may be performed in the office on the projection side (the office in which the captured image is projected). In addition, the extraction process of the person part described in steps S802 to S804 may be performed after the combining process described in step S706. Furthermore, although description is not given in this example, the image captured by the background camera 102 and the image captured by the back camera 105 are transmitted to the office 2 that is connected to the office 1, synchronously or asynchronously with the transmission of the image performed in step S707.

Figure 9:
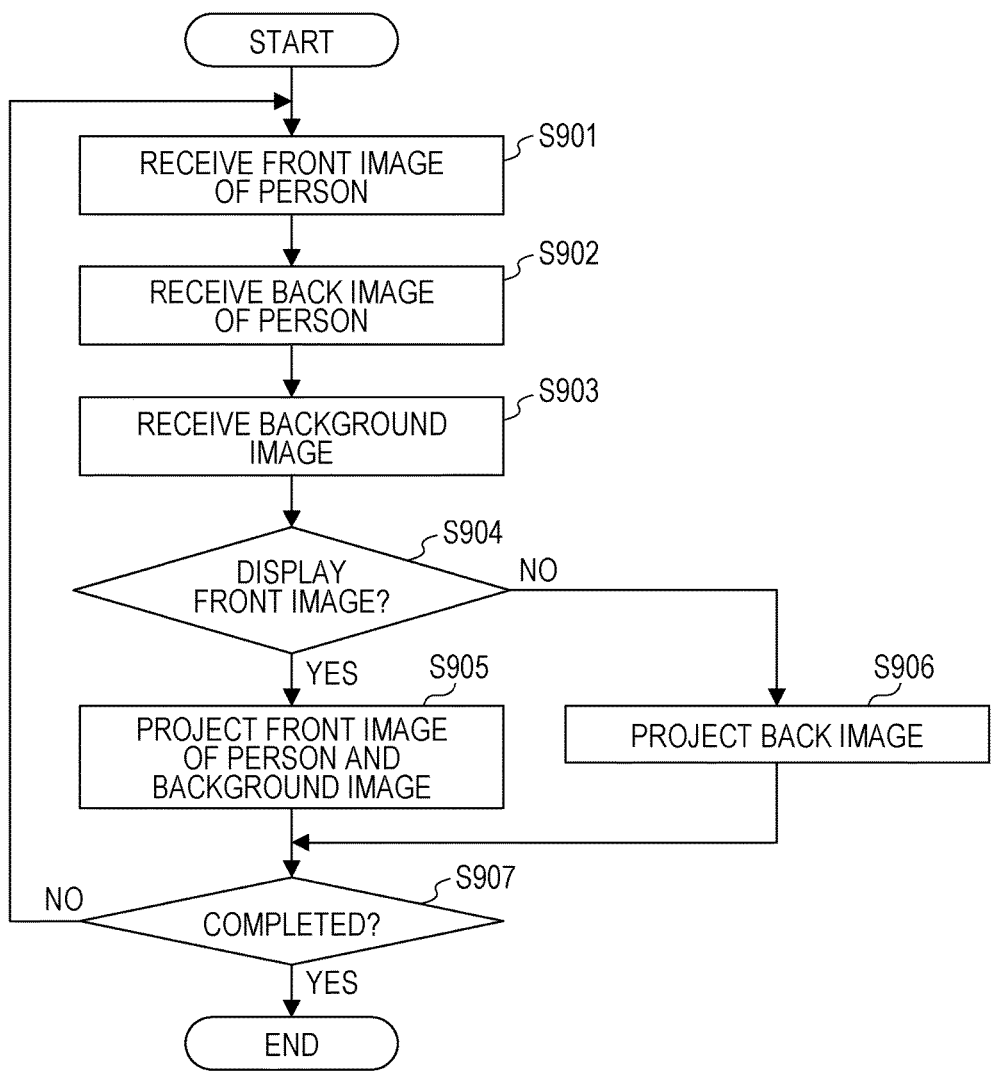
FIG. 9 is a flowchart of a process to project an image according to the exemplary embodiment of the present invention.

FIG. 9 is a flowchart of a process to project the image transmitted from an office connected to the office. Each of operations (steps) illustrated in FIG. 9 is realized by the CPU 316 that is disposed in the office 1 and that executes a control program stored in the ROM 318. Note that in this example, the processes described with reference to FIGS. 7 and 8 are performed in the office 2 by, for example, the CPU provided in the office 2 in the same manner, and the resultant images transmitted from the office 2 are projected in the office 1.

In step S901, the front image of a person captured by the front camera 114 is received. In step S902, the back image of the person captured by the back camera 115 is received. In step S903, the background image captured by the background camera 112 is received.

In step S904, it is determined whether an instruction to display the front image of the person is received or an instruction to display the back image of the person is received. The instructions are received in accordance with the operation performed by the person 106 and detected by the digitizer 201. If it is determined that an instruction to display the front image of the person is received, the processing proceeds to step S905, where the front image of the person received in step S901 and the background image received in step S903 are projected onto the screen 103. However, if it is determined that an instruction to display the back image of the person is received, the processing proceeds to step S906, where the back image of the person received in step S902 is projected onto the screen 103.

In step S907, it is determined whether an instruction to complete the remote communication is received. If it is determined that an instruction to complete the remote communication is received, the processing is completed. However, if it is determined that an instruction to complete the remote communication is not received, the processing returns to step S901. Thereafter, the processes in step S901 and the subsequent steps are performed again. Note that the processes in the flowchart illustrated in FIG. 7 and the processes in the flowchart illustrated in FIG. 9 are continuously and concurrently performed during remote communication.

As described above, the remote communication system according to the present exemplary embodiment includes the projector 101 that projects, onto the screen 103, the image transmitted from the office 2 located in a remote site. In addition, the screen 103 has a plurality of the front cameras 104 disposed therein. The CPU 316 performs an extraction process that extracts a person part from each of the images captured by the front cameras 104 (refer to step S703) and a combining process that combines the plurality of images captured by the front cameras 104 (refer to step S706). Furthermore, the remote communication system includes the projector 111 that projects, onto the screen 113 disposed in the office 2, the image subjected to the extraction process and the combining process.

By having such a configuration, communication can be performed with a remote site while giving a realistic sensation as if the persons faced each other in close proximity.

Other Embodiments

In addition, the present invention can be achieved by performing the following processes. That is, the processes are providing a storage medium including software program code that realizes the functions of the above-described exemplary embodiment to a system or an apparatus and reading out the program code stored in the storage medium using a computer (a CPU or an MPU) in the system or the apparatus.

In such a case, the program code itself read from the storage medium realizes the functions of the above-described exemplary embodiment and, thus, the program code and the storage medium storing the program code constitutes the present invention.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A remote communication system comprising:
a first projector configured to project an image transmitted from a remote site onto a first projection plane;
a plurality of image capturing units disposed on the first projection plane;
an extraction unit configured to extract a person part from each of images captured by the image capturing units;
a combining unit configured to combine the images captured by the image capturing units; and
a second projector configured to project, onto a second projection plane disposed in the remote site, the images extracted by the extraction unit and combined by the combining unit,
wherein the plurality of image capturing units is sequentially arranged from the top in the vertical direction, and a distance from a floor surface to, among the plurality of image capturing units, one that is arranged at a position closest to the floor surface is shorter than a distance that is calculated by equally dividing a distance from the floor surface to, among the plurality of image capturing units, one that is arranged at a most distant position from the floor surface by the number of the plurality of image capturing units.

2. The remote communication system according to claim 1, wherein the combining unit combines images extracted by the extraction unit.

3. The remote communication system according to claim 1, wherein the extraction unit makes a pixel having a distance from at least one of the image capturing units to a subject that is greater than a predetermined value transparent.

4. The remote communication system according to claim 1, wherein the combining unit removes overlapping portions among the plurality of images and combines the images.

5. The remote communication system according to claim 4, wherein the combining unit identifies the overlapping portions among the plurality of images on a basis of angles of view of the image capturing units, arrangement intervals of the image capturing units, and a distance between at least one of the image capturing units and a person.

6. The remote communication system according to claim 1, further comprising:
a background image capturing unit configured to capture the image of background,
wherein the second projector projects an image obtained by combining the images extracted by the extraction unit by the combining unit together with the image captured by the background image capturing unit.

7. The remote communication system according to claim 1, further comprising:
a detecting unit configured to detect an operation performed on the first projection plane by a user; and
a switching unit configured to switch among images projected by the first projector in accordance with the operation performed by the user and detected by the detecting unit.

8. The remote communication system according to claim 1, wherein the plurality of image capturing units comprises a first image capturing unit, a second image capturing unit, and a third image capturing unit sequentially arranged from the top in the vertical direction, and
wherein the arrangement interval between the first image capturing unit and the second image capturing unit is shorter than the arrangement interval between the second image capturing unit and the third image capturing unit.

9. The remote communication system according to claim 1, wherein the plurality of image capturing units comprises a first image capturing unit, a second image capturing unit, and a third image capturing unit sequentially arranged from the top in the vertical direction, and
wherein the arrangement interval between the third capturing unit and a floor surface is shorter than the arrangement interval between the second capturing unit and the third capturing unit.

10. The remote communication system according to claim 9,
wherein the arrangement interval between the third capturing unit and a floor surface is equal to or shorter than the arrangement interval between the first capturing unit and the second capturing unit.

11. A remote communication system comprising:
a projector configured to project an image transmitted from a remote site onto a projection plane;
a plurality of image capturing units disposed on the projection plane;
an extraction unit configured to extract a person part from each of images captured by the image capturing units;
a combining unit configured to combine images captured by the image capturing units; and
a transmitter configured to transmit, to the remote site, an image obtained by combining the images extracted by the extraction unit by the combining unit,
wherein the plurality of image capturing units is sequentially arranged from the top in the vertical direction, and a distance from a floor surface to, among the plurality of image capturing units, one that is arranged at a position closest to the floor surface is shorter than a distance that is calculated by equally dividing a distance from the floor surface to, among the plurality of image capturing units, one that is arranged at a most distant position from the floor surface by the number of the plurality of image capturing units.

12. A method for controlling a remote communication system, the remote communication system including a projector configured to project an image transmitted from a remote site onto a projection plane and a plurality of image capturing units disposed on the projection plane, the method comprising:
extracting a person part from each of images captured by the image capturing units;
combining the images captured by the image capturing units; and transmitting, to the remote site, the image obtained by combining the images extracted by the extraction unit by the combining unit, wherein the plurality of image capturing units is sequentially arranged from the top in the vertical direction, and a distance from a floor surface to, among the plurality of image capturing units, one that is arranged at a position closest to the floor surface is shorter than a distance that is calculated by equally dividing a distance from the floor surface to, among the plurality of image capturing units, one that is arranged at a most distant position from the floor surface by the number of the plurality of image capturing units.

13. The method according to claim 12, wherein the combining step combines images extracted by the extraction step.

14. The method according to claim 12, wherein the combining step removes overlapping portions among the plurality of images and combines the images.

15. The method according to claim 12, wherein the combining step identifies the overlapping portions among the plurality of images on a basis of angles of view of the image capturing units, arrangement intervals of the image capturing units, and a distance between at least one of the image capturing units and a person.

16. The method according to claim 12, further comprising:
a background image capturing step configured to capture the image of background,
wherein the second projector projects an image obtained by combining the images extracted by the extraction step by the combining step together with the image captured by the background image capturing step.

17. The method according to claim 12, further comprising:
a detecting step configured to detect an operation performed on the projection plane by a user; and
a switching step configured to switch among images projected by the projector in accordance with the operation performed by the user and detected by the detecting step.

18. The method according to claim 12, wherein the plurality of image capturing units comprises a first image capturing unit, a second image capturing unit, and a third image capturing unit sequentially arranged from the top in the vertical direction, and
wherein the arrangement interval between the first image capturing unit and the second image capturing unit is shorter than the arrangement interval between the second image capturing unit and the third image capturing unit.

19. The method according to claim 12, wherein the plurality of image capturing units comprises a first image capturing unit, a second image capturing unit, and a third image capturing unit sequentially arranged from the top in the vertical direction, and
wherein the arrangement interval between the third capturing unit and a floor surface is shorter than the arrangement interval between the second capturing unit and the third capturing unit.

20. The method according to claim 19,
wherein the arrangement interval between the third capturing unit and a floor surface is equal to or shorter than the arrangement interval between the first capturing unit and the second capturing unit.

* * * * *